(12) United States Patent
Miyadera et al.

(10) Patent No.: US 7,840,108 B2
(45) Date of Patent: Nov. 23, 2010

(54) LIGHT BRANCHING OPTICAL WAVEGUIDE

(75) Inventors: Nobuo Miyadera, Ibaraki (JP); Rei Yamamoto, Ibaraki (JP)

(73) Assignee: Hitachi Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/573,810

(22) PCT Filed: May 25, 2005

(86) PCT No.: PCT/JP2005/009531
§ 371 (c)(1),
(2), (4) Date: Mar. 28, 2006

(87) PCT Pub. No.: WO2005/116704
PCT Pub. Date: Dec. 8, 2005

(65) Prior Publication Data
US 2007/0036486 A1    Feb. 15, 2007

(30) Foreign Application Priority Data
May 26, 2004  (JP) .............................. 2004-156230

(51) Int. Cl.
G02B 6/26  (2006.01)
G02B 6/42  (2006.01)
(52) U.S. Cl. .............................. 385/45; 385/15; 385/42
(58) Field of Classification Search .................. 385/45, 385/48
See application file for complete search history.

(56) References Cited
U.S. PATENT DOCUMENTS
5,664,038 A * 9/1997 Okushima .................... 385/50

(Continued)

FOREIGN PATENT DOCUMENTS
JP     2000-121857       4/2000

(Continued)

OTHER PUBLICATIONS

Soldano, et al., "Optical Multi-Mode Interference Devices Based on Self-Imaging: Principles and Applications", Journal of Lightwave Technology, vol. 13, No. 4 (Apr. 1995), pp. 615-627.*

*Primary Examiner*—Uyen-Chau N Le
*Assistant Examiner*—John M Bedtelyon
(74) *Attorney, Agent, or Firm*—Antonelli, Terry, Stout & Kraus, LLP.

(57) ABSTRACT

Provided is a light branching optical waveguide including: at least one incident light waveguide (A) optically connected to one end of a multi-mode optical waveguide; and output light waveguides (B) larger in number than the incident light waveguide (A) optically connected to the other end thereof, the light branching optical waveguide being characterized in that: an intensity distribution of light incident from at least one optical waveguide (a) out of the incident light waveguide (A) on the multi-mode optical waveguide at a connecting surface of the incident light waveguide (A) and the multi-mode optical waveguide is asymmetric with respect to a geometrical central axis of the optical waveguide (a); and an extended line of the geometrical center axis of the optical waveguide (a) does not coincide with a geometrical central axis of the multi-mode optical waveguide. Accordingly, it is possible to obtain a low-loss light branching optical waveguide having a reduced branch loss and a reduced variation in branching ratio, and further to obtain a light branching optical waveguide having small wavelength dependence as well as a reduced branch loss and a reduced variation in branching ratio.

36 Claims, 4 Drawing Sheets

U.S. PATENT DOCUMENTS

| | | |
|---|---|---|
| 6,236,784 B1 | 5/2001 | Ido |
| 6,970,625 B2 * | 11/2005 | Johannessen et al. ......... 385/45 |
| 7,088,889 B2 * | 8/2006 | Takahashi et al. ............. 385/43 |
| 7,302,138 B2 * | 11/2007 | Lu ............................... 385/37 |
| 2003/0202746 A1 * | 10/2003 | Hanashima .................. 385/45 |

FOREIGN PATENT DOCUMENTS

| | | |
|---|---|---|
| JP | 2004-101995 | 4/2004 |

* cited by examiner

BACKGROUND

US 7,840,108 B2

LIGHT BRANCHING OPTICAL WAVEGUIDE

TECHNICAL FIELD

The present invention relates to a light branching optical waveguide and an optical device using the same.

BACKGROUND ART

There has been an abruptly growing demand on information transmission in association with the recent widespread use of personal computers and the Internet, so optical transmission with a high transmission rate has become widespread. An optical waveguide has been used as an optical interconnection in such optical transmission.

By the way, an optical branching circuit and an optical multiplexing circuit serving as basic elements are indispensable to an integrated optical circuit, and an optical waveguide branched to provide a Y shape has been conventionally known. As shown in FIG. 1, a conventional Y branch optical waveguide is structured by connecting a main waveguide 1, a taper waveguide 2, and branching waveguides 3 and 4, and a branch point 5 is present between the taper waveguide 2 and the branching waveguides 3 and 4.

A reduction in light loss is an important breakthrough in such Y branch optical waveguide, and one possible method for achieving the breakthrough is to increase the radius of curvature of each of the branching waveguides 3 and 4 each curving in the form of an arc. In this case, however, the size of a circuit must be increased. In actuality, the size of the circuit is restricted by the size of a substrate, so an increase in radius of curvature is limited.

In addition, the branch point 5 must be sharp for a reduction in light loss. However, the point cannot be of a completely sharp structure owing to, for example, the accuracy of patterning or etching. An optical central portion having the highest light intensity (the central axis of an optical propagation mode) is scattered at the branch point 5, thereby causing a large branch loss.

Furthermore, when implementation is performed by connecting incident and output fibers to a 1×N optical splitter, an offset may occur between the incident fiber and the incident straight line-optical waveguide of an optical circuit owing to, for example, the tool accuracy of a jig and the mechanical accuracy of an alignment device. In this case, a higher-order mode and a radiation mode are excited in addition to a basic mode in an optical waveguide, so a variation in branching ratio occurs.

To cope with the above problem, there has been proposed that, in a branching multiplexing optical waveguide circuit obtained by: connecting a taper waveguide to a main waveguide; connecting multiple branching optical waveguides each having an inflectural point to a branch point of the taper waveguide; and connecting an output waveguide to each of the branching optical waveguides, an offset is arranged at the connecting point of the point of inflection of each branching optical waveguide and the corresponding output waveguide, and a gap is arranged between two arbitrary branching waveguides at the branch point of the taper waveguide (see, for example, Claims in Patent Document 1 below). In such incident light waveguide, when the central axis (central axis of an optical propagation mode) h of the intensity distribution (field distribution) of propagating light and the geometrical central axis a of an incident light waveguide (core portion) 7 coincide with each other, and the intensity distribution of light is of a shape symmetric with respect to the central axis h of the intensity distribution of light as shown in FIG. 2, a light branching optical waveguide having a reduced branch loss and a reduced variation in branching ratio can be obtained by means of the above method.

However, for example, when the optical waveguide has a curve structure, the case where the central axis (central axis of an optical propagation mode) h of the intensity distribution of light and the geometrical central axis a of the incident light waveguide (core portion) 7 do not coincide with each other as shown in FIG. 3, or the case where the intensity distribution of light is of a shape asymmetric with respect to the central axis h of the intensity distribution of light as shown in FIG. 4 even though the central axis h of the intensity distribution of light and the geometrical central axis a of the incident light waveguide (core portion) 7 coincide with each other occurs. In each of those cases, there arises a problem in that the branching ratio of the light branching optical waveguide cannot be equal even when such offset structure as described above is arranged.

On the other hand, when light propagating in an incident light waveguide has an intensity distribution (field distribution) of light asymmetric with respect to the geometrical central axis of the incident light waveguide, making the shape of the distribution symmetric requires a long straight line portion, so there arises a problem in that the size of a module increases.

A multi-mode interference (which may hereinafter be abbreviated as "MMI") type Y branch optical waveguide has been known other than the above light branching optical waveguide using a taper waveguide, and various kinds of such MMI waveguides have been proposed (see, for example, Claims in Patent Document 2 below). The MMI type Y branch optical waveguide is composed of an incident waveguide, a multi-mode waveguide portion, and two output waveguides. When light of a basic mode propagating in the incident waveguide enters on the central axis of the multi-mode waveguide, light of the basic mode (n=0) and light of a higher-order mode (n=2) are excited, and the waveform of propagating light deforms owing to interference due to a difference in phase speed between light of the basic mode and light of the higher-order mode. The propagating light has an intensity distribution having two peaks at a site where light of the basic mode and light of the higher-order mode are different from each other in phase by π. Arranging the two output waveguides in correspondence with the peaks can achieve the branching of light to a branching ratio of 1:1 (equal) (see paragraphs [0038] and [0039] in Patent Document 2 below). Therefore, light can be branched at a short distance as compared to a taper waveguide. In addition, there does not arise a problem in that such optical central portion having the highest light intensity as described above is scattered at a branch point, to thereby cause a large branch loss.

However, the above branching ratio of 1:1 (equal) in branching of light is achieved only in the case where the mode of light propagating in the incidence waveguide is a basic mode alone, the basic mode is symmetric with respect to the central axis of the incidence waveguide, the central axis of the incidence waveguide and that of the multi-mode waveguide coincide with each other, and the multi-mode waveguide is of a shape symmetric with respect to its central axis. That is, for example, in the case where the intensity distribution (field distribution) of light propagating in an optical waveguide on an incident side is asymmetric with respect to the geometrical central axis of the optical waveguide, there arises a problem in that the branching ratio of light cannot be equal even in an MMI type light branching optical waveguide.

In actuality, an incident light into a multi-mode optical waveguide often includes components of a higher-order mode and a radiation mode in addition to a basic mode propagating in an incident light waveguide. In addition, for example, when the incident light waveguide has a curvature, the basic mode is generally asymmetric.

Furthermore, in an MMI type light branching optical waveguide, the position at which light of a basic mode and light of a higher-order mode interfere with each other varies depending on a wavelength. Therefore, there arises a problem in that each of a loss of light intensity and a branching ratio is dependent on the wavelength. That is, the design of the MMI type light branching optical waveguide must be changed in accordance with the wavelength of light, so there arises a problem such as a reduction in efficiency of production.

Patent Document 1: JP 04-213407 A
Patent Document 2: JP 2000-121857 A

DISCLOSURE OF THE INVENTION

The present invention has been made in view of the above problems, and an object of the present invention is to provide a low-loss light branching optical waveguide having a reduced branch loss and a reduced variation in branching ratio. Another object of the present invention is to provide a light branching optical waveguide having small wavelength dependence as well as a reduced branch loss and a reduced variation in branching ratio.

The inventors of the present invention have found that a branch loss and a variation in branching ratio can be reduced by shifting the geometrical central axis of an incident light waveguide and the geometrical central axis of a multi-mode optical waveguide and/or by making the core shape of the multi-mode optical waveguide asymmetric with respect to the geometrical central axis of the waveguide even when the intensity distribution (field distribution) of light propagating in an optical waveguide on an incident side is asymmetric with respect to the geometrical central axis of the optical waveguide.

Furthermore, they have found that a branch loss and a variation in branching ratio can be suppressed irrespective of a wavelength by matching the wavelength dependence of a field distribution generated by shifting the geometrical central axis of an incident light waveguide and the geometrical central axis of a multi-mode optical waveguide to the wavelength dependence of a field distribution generated by making the core shape of the multi-mode optical waveguide asymmetric with respect to the geometrical central axis of the waveguide. The present invention has been completed by this finding.

In other words, the present invention provides:

(1) A light branching optical waveguide, comprising: at least one incident light waveguide (A) optically connected to one end of a multi-mode optical waveguide; and output light waveguides (B) larger in number than the incident light waveguide (A) optically connected to the other end thereof, the light branching optical waveguide being characterized in that: an intensity distribution of light entering from at least one optical waveguide (a) out of the incident light waveguide (A) into the multi-mode optical waveguide at a connecting surface of the incident light waveguide (A) and the multi-mode optical waveguide is asymmetric with respect to a geometrical central axis of the optical waveguide (a); and an extended line of the geometrical central axis of the optical waveguide (a) does not coincide with a geometrical central axis of the multi-mode optical waveguide;

(2) A light branching optical waveguide, comprising: at least one incident light waveguide (A) optically connected to one end of a multi-mode optical waveguide; and output light waveguides (B) larger in number than the incident light waveguide (A) optically connected to the other end thereof, the light branching optical waveguide being characterized in that: an intensity distribution of light entering from at least one optical waveguide (a) out of the incident light waveguide (A) into the multi-mode optical waveguide at a connecting surface of the incident light waveguide (A) and the multi-mode optical waveguide is asymmetric with respect to a geometrical central axis of the optical waveguide (a); and a core shape of the multi-mode optical waveguide is asymmetric with respect to a geometrical central axis of the multi-mode optical waveguide;

(3) A light branching optical waveguide according to the above item (2), in which an extended line of the geometrical central axis of the optical waveguide (a) does not coincide with the geometrical central axis of the multi-mode optical waveguide;

(4) A light branching optical waveguide according to the above item (1) or item (3), characterized in that an optical central axis having a peak intensity in the intensity distribution of light entering into the multi-mode optical waveguide from the optical waveguide (a) substantially coincides with the geometrical central axis of the multi-mode optical waveguide;

(5) A light branching optical waveguide according to any one of the above items (2) to (4), in which the core shape of the multi-mode optical waveguide has a notch at least one of its side edges;

(6) A light branching optical waveguide according to the above item (5), in which: the notch is obtained by cutting out a core of the multi-mode optical waveguide from a side to be connected to the incident light waveguide (A) to a side edge of the core; and a shape of the notch has a sinusoidal curve structure ranging from the side to be connected to the incident light waveguide (A) to a side to be connected to the output light waveguides (B);

(7) A light branching optical waveguide according to the above item (1) or item (2), in which: the incident light waveguide (A) comprises one incident light waveguide; the output light waveguides (B) includes two or more output light waveguides; and a branching ratio between quantities of light branched into the two or more respective output light waveguides is substantially equal;

(8) A light branching optical waveguide according to any one of the above items (1) to (7), in which the incident light waveguide (A) and/or the output light waveguides (B) includes a single-mode optical waveguide;

(9) A light branching optical waveguide according to any one of the above items (1) to (8), in which at least one of the core or a clad constituting the multi-mode optical waveguide is composed of a polymer partially or entirely;

(10) A light branching optical waveguide according to the above item (9), in which the polymer comprises a polyimide-based resin containing fluorine; and

(11) An optical device comprising the light branching optical waveguide according to any one of the above items (1) to (10).

According to the present invention, there can be provided a low-loss light branching optical waveguide having a reduced branch loss and a reduced variation in branching ratio. In addition, there can be provided a light branching optical waveguide having small wavelength dependence as well as a reduced branch loss and a reduced variation in branching ratio.

DESCRIPTION OF SYMBOLS 1. main waveguide (core portion)
2. taper waveguide (core portion)
3. branching waveguide (core portion)
4. branching waveguide (core portion)
5. branch point
6. multi-mode optical waveguide (core portion)
7. incident light waveguide (core portion)
8. output light waveguide (core portion)
9. output light waveguide (core portion)
10. connecting surface of incident light waveguide and multi-mode optical waveguide
a: geometrical central axis of incident light waveguide
b: geometrical central axis of multi-mode optical waveguide
d: distance between output light waveguides
h: central axis (central axis of optical propagation mode) of intensity distribution of light
L: length of core of multi-mode optical waveguide
$w_1$: width of incident light waveguide and output light waveguide
$w_2$: width of multi-mode optical waveguide
x: offset distance
z: distance from side edge

BEST MODE FOR CARRYING OUT THE INVENTION

A light branching optical waveguide of the present invention comprises: a multi-mode optical waveguide; at least one incident light waveguide (A) optically connected to one end of the multi-mode optical waveguide; and a larger number of output light waveguides (B) than that of the incident light waveguide (A) optically connected to the other end of the multi-mode optical waveguide. Hereinafter, the light branching optical waveguide will be specifically described by taking the case where the incident light waveguide (A) is composed of one incident light waveguide, and the output light waveguides (B) are composed of two output light waveguides as an embodiment.

Figure 5:
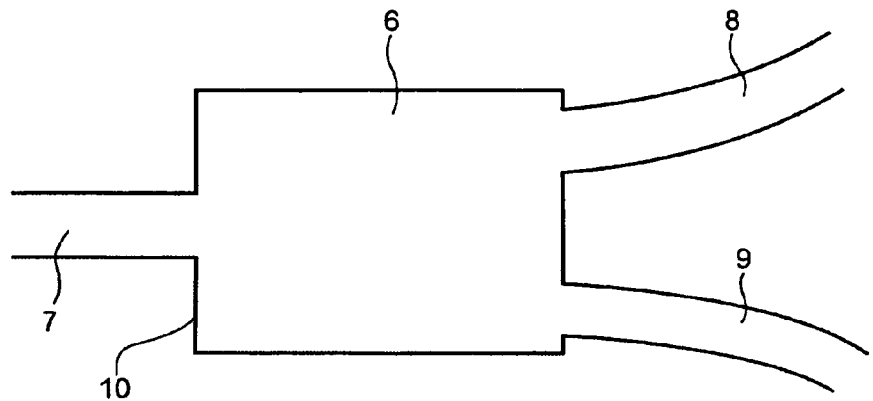
FIG. 5 is a schematic view showing a basic constitution of a multi-mode light branching optical waveguide.

At first, the basic constitution of the light branching optical waveguide of the present invention will be described with reference to FIG. 5. The light branching optical waveguide of the present invention is basically constituted by: optically connecting one incident light waveguide (core portion) 7 to one end of a multi-mode optical waveguide (core portion) 6; and optically connecting, for example, two output light waveguides (core portions) 8 and 9 to the other end of the multi-mode optical waveguide (core portion) 6. Here, a branching ratio between the quantities of light branched into the two output light waveguides (core portions) 8 and 9 is substantially equal. The optical waveguides (core portions) 7, 8, and 9, and the multi-mode optical waveguide (core portion) 6 have only to be optically connected to one another. As shown in FIG. 5, the optical waveguides (core portions) 7, 8, and 9, and the multi-mode optical waveguide (core portion) 6 may be connected to one another with no gap between them. Alternatively, the optical waveguides (core portions) 7, 8, and 9, and the multi-mode optical waveguide (core portion) 6 may be connected to one another with a gap between them. Furthermore, the case where optical fibers are directly optically connected to the multi-mode optical waveguide instead of the optical waveguides (core portions) 7, 8, and 9 is also included in the present invention.

The intensity distribution of light entering into the multi-mode optical waveguide (core portion) 6 from the incident light waveguide (core portion) 7 at a connecting surface 10 of the incident light waveguide (core portion) 7 and the multi-mode optical waveguide (core portion) 6 is asymmetric with respect to the geometrical central axis of the incident light waveguide. The term "geometrical central axis of an incident light waveguide" as used herein refers to the central axis of a core constituting the incident light waveguide, and a distance from the central axis to a clad on one side is equal to a distance from the central axis to a clad on the other side.

Figure 6:
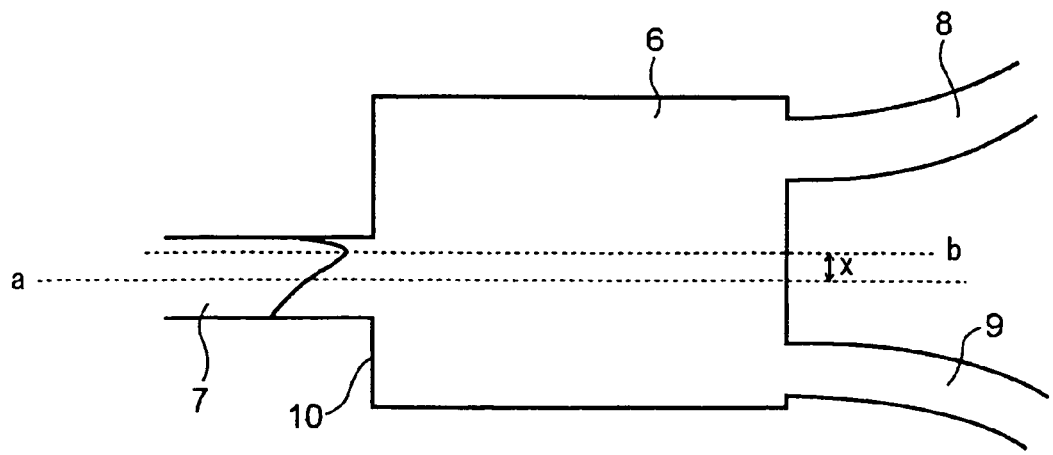
FIG. 6 is a schematic view showing a constitution of a light branching optical waveguide of the present invention.

FIG. 6 shows a core shape of the light branching optical waveguide in a first aspect of the present application. The light branching optical waveguide is characterized in that the extended line of the geometrical central axis a of the incident light waveguide (core portion) 7 does not coincide with the geometrical central axis b of the multi-mode optical waveguide (core portion) 6. The term "geometrical central axis of a multi-mode optical waveguide" as used herein refers to the central axis of a core constituting the multi-mode optical waveguide, and a distance from the central axis to a clad on one side is equal to a distance from the central axis to a clad on the other side.

An offset distance x between the extended line of the geometrical central axis a of the incident light waveguide (core portion) 7 and the geometrical central axis b of the multi-mode optical waveguide (core portion) 6 is appropriately determined in accordance with the asymmetry of the intensity distribution of light entering into the multi-mode optical waveguide from the incident light waveguide at the connecting surface of the incident light waveguide and the multi-mode optical waveguide. Usually, the distance x is preferably 1.5 μm or less, more preferably 0.7 μm or less.

Figure 1:
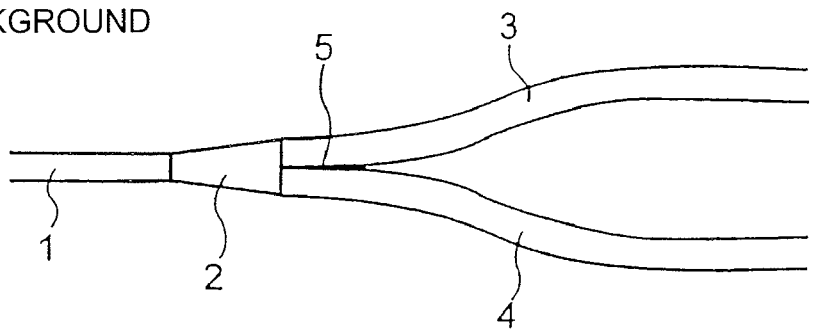
FIG. 1 is a schematic view showing a structure of a conventional Y branch optical waveguide.
Figure 2:
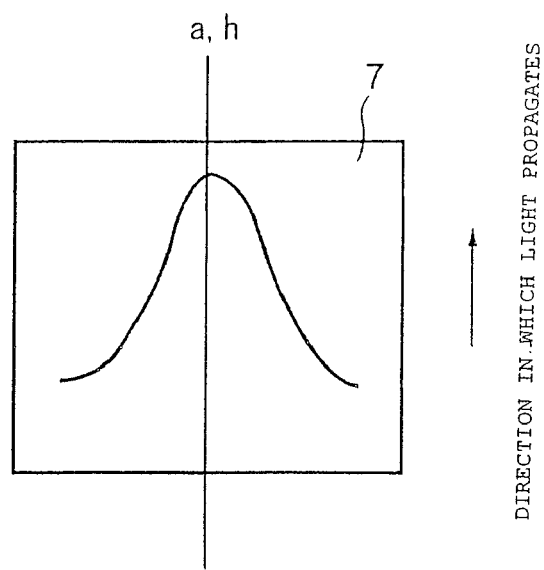
FIG. 2 is a schematic view showing an intensity distribution (field distribution) of light.
Figure 3:
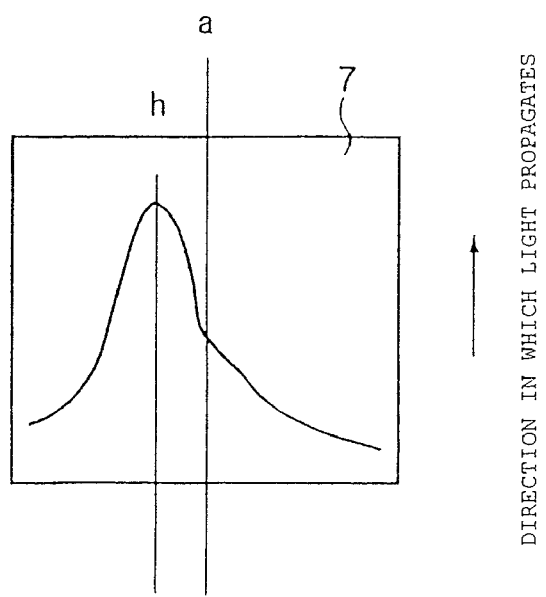
FIG. 3 is a schematic view showing another intensity distribution (field distribution) of light.
Figure 4:
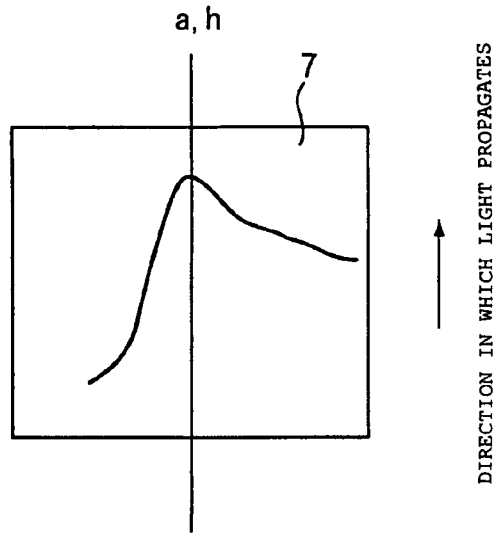
FIG. 4 is a schematic view showing still another intensity distribution (field distribution) of light.

In addition, as shown in FIG. 6, the offset distance x is preferably set in such a manner that an optical central axis (the central axis of an optical propagation mode) having a peak intensity in the intensity distribution of light entering into the multi-mode optical waveguide (core portion) 6 from the incident light waveguide (core portion) 7 substantially coincides with the geometrical central axis b of the multi-mode optical waveguide (core portion) 6. This setting is particularly effective in the case where the intensity distribution of light propagating in the incident light waveguide (core portion) 7 is of such shape as shown in FIG. 3.

As described above, a branch loss and a variation in branching ratio can be reduced by an offset between the geometrical central axis a of the incident light waveguide and the geometrical central axis b of the multi-mode optical waveguide even when the intensity distribution (field distribution) of light propagating in an optical waveguide on an incident side is asymmetric with respect to the geometrical central axis of the optical waveguide.

The light branching optical waveguide according to a second aspect of the present application has a basic constitution shown in FIG. 5, and is characterized in that the core shape of the multi-mode optical waveguide (core) 6 is asymmetric with respect to the geometrical central axis b of the multi-mode optical waveguide.

The multi-mode optical waveguide usually has a shape symmetric with respect to its geometrical central axis b. The length and width of the multi-mode optical waveguide are controlled so that, for example, light propagating in the multi-mode optical waveguide is provided with an intensity distribution having two nearly equal peaks. Arranging two output light waveguides in correspondence with the peaks achieves the branching of light at a branching ratio of 1:1 (equal). However, as described above, when the intensity distribution (field distribution) of light propagating in an optical waveguide on an incident side is asymmetric with respect to the geometrical central axis of the optical waveguide on the incident side, light propagating in the multi-mode optical waveguide does not have any intensity distribution having two nearly equal peaks, with the result that the branching ratio of light in a branching optical waveguide cannot be equal.

On the other hand, the second aspect of the invention is characterized in that the core shape of the multi-mode optical waveguide is asymmetric with respect to the geometrical central axis of the multi-mode optical waveguide. Here, the geometrical central axis of the multi-mode optical waveguide is identical to the above-described central axis of a core constituting the multi-mode optical waveguide, and does not move irrespective of the presence or absence of a notch to be described in detail later.

Possible examples of a core shape asymmetric with respect to the geometrical central axis of a multi-mode optical waveguide include various shapes. In consideration of, for example, ease of production, the core shape of the multi-mode optical waveguide preferably has a notch at least one of its side edges.

Figure 7:
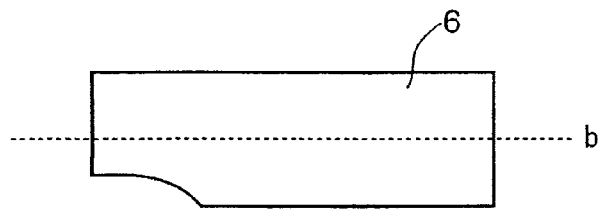
FIG. 7 is a schematic view showing a core shape of a multi-mode optical waveguide of the present invention.
Figure 8:
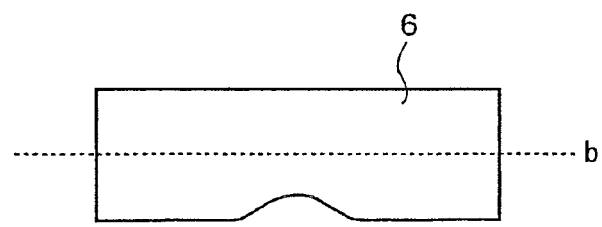
FIG. 8 is a schematic view showing another core shape of the multi-mode optical waveguide of the present invention.

Here, the notch has only to be a structure obtained by cutting a side edge of the core into a certain shape. For example, the notch may be constituted in such a manner that a distance between the side edge of the core and the geometrical central axis of the multi-mode optical waveguide varies at least partially toward the traveling direction of light. More specifically, a shape obtained by cutting the side edge in such a manner that the width of the core at the portion of the multi-mode optical waveguide into which light enters is made smaller than that of the core at the portion of the waveguide from which light outgoes as shown in FIG. 7, a shape obtained by cutting the side edge in the intermediate portion of the core of the multi-mode optical waveguide as shown in FIG. 8, or the like can be exemplified.

Figure 9:
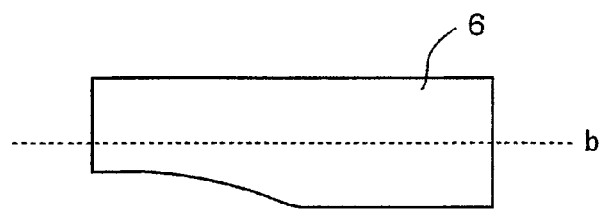
FIG. 9 is a schematic view showing still anther core shape of the multi-mode optical waveguide of the present invention.

In addition, a shape as shown in FIG. 9 can be exemplified, in which a distance between the side edge of the core of the multi-mode optical waveguide and the geometrical central axis b of the multi-mode optical waveguide varies toward the traveling direction of light in a curving manner. In this case, a change in distance between the side edge of the core of the multi-mode optical waveguide and the geometrical central portion b of the multi-mode optical waveguide is desirably moderate around the exit of the multi-mode optical waveguide. A loss of light intensity can be additionally suppressed with such shape.

Furthermore, the distance is preferably increased like a sinusoidal function from the entrance of the multi-mode optical waveguide to the exit thereof. That is, the notch preferably has a sinusoidal curve structure ranging from the entrance portion of the multi-mode optical waveguide to the exit portion thereof. The structure has advantages in that a loss of light intensity can be additionally suppressed and in that the structure can be easily designed by means of CAD or the like.

In addition, in order to obtain a low-loss, multi-mode, light branching optical waveguide having a reduced branch loss, a reduced variation in branching ratio, and small wavelength dependence as an object of the present invention, a third aspect of the present application is more preferable. That is, it is more preferable that: the extended line of the geometrical central axis of an incident light waveguide do not coincide with the geometrical central axis of a multi-mode optical waveguide; and the core shape of the multi-mode optical waveguide be asymmetric with respect to the geometrical central axis of the multi-mode optical waveguide.

As described above, a branch loss and a variation in branching ratio can be reduced by an offset between the geometrical central axis of an incident light waveguide and the geometrical central axis of a multi-mode optical waveguide. In this case, however, the intensity distribution (field distribution) of light propagating in an optical waveguide induces wavelength dependence. Therefore, the design of the optical waveguide must be changed in accordance with the wavelength of light to be used.

On the other hand, a branch loss and a variation in branching ratio can be reduced by making the core shape of a multi-mode optical waveguide asymmetric with respect to the geometrical central axis of the waveguide. In this case, however, a field distribution induces the wavelength dependence. Therefore, the design of the optical waveguide must be changed in accordance with the wavelength of light to be used as in the case where an offset is performed.

In contrast, the third aspect of the present invention is such that a branch loss and a variation in branching ratio are suppressed irrespective of a wavelength by matching the wavelength dependence of a field distribution generated by an offset to the wavelength dependence of a field distribution generated by making the core shape of a multi-mode optical waveguide asymmetric with respect to the geometrical central axis of the waveguide. That is, an optical waveguide is designed in such a manner that the wavelength dependence of the offset is caused to offset that of the asymmetry of the core shape of the multi-mode optical waveguide, the offset and the asymmetry being responsible for the occurrence of two kinds of wavelength dependence.

In the foregoing description, an output light waveguide has two so-called Y branch optical waveguides. However, the present invention is not limited thereto, and is applicable to an optical waveguide having furthermore output light waveguides. The term "Y branching" or "Y-type branching" as used herein refers not to a Y-type branching structure in a narrow sense constituted by three straight lines but to the circuit element of an optical waveguide of a 1×2 branching structure in which two outputs branch out from one input (or vice versa).

In addition, description has been given of the case where a branching ratio between the quantities of light branched into the two output light waveguides (core portions) 8 and 9 is substantially equal. However, an arbitrary branching ratio such as a branching ratio of 1:2 can be obtained by controlling the length and width of a multi-mode optical waveguide (see, for example, JP-A-2000-121857). Therefore, applying the present invention to this fact can provide a light branching optical waveguide having an arbitrary branching ratio, a reduced branch loss, a reduced variation in branching ratio, and small wavelength dependence.

Furthermore, in the foregoing description, one incident light waveguide is used. However, multiple incident light waveguides may be used. In this case, at least one optical waveguide out of the multiple incident light waveguides has only to satisfy the above conditions.

In the present invention, at least one of the incident light waveguide and the output light waveguides is preferably a single-mode optical waveguide. The use of a single-mode optical waveguide stabilizes the intensity distribution of input light as compared to the use of a multi-mode optical waveguide. Therefore, an effect of the present invention proposing a branching structure corresponding to the intensity distribution of input light can be adequately and stably exerted.

In addition, at least one of the incident light waveguide and the output light waveguides may be an optical fiber. The present invention exerts a particular effect when multiple branching structures are continuously used, for example, when 1×2 branching structures are connected like a tree to constitute a 1×n branching splitter. In this case, an incident light waveguide on a first stage is often connected to an optical fiber. According to one preferred embodiment of the present invention, an incident light waveguide itself is an optical fiber. An optical fiber is connected obliquely in some cases because a reflection loss can be reduced. In such cases, the present invention is particularly effective because the intensity distribution of incident light becomes asymmetric.

Furthermore, in general, in bidirectional optical transmission, light is propagated from an output light waveguide to an incident light waveguide in a Y-type branching optical waveguide. The optical waveguide of the present invention can be used as not only a light branching optical waveguide but also a light multiplexing optical waveguide. When the optical waveguide is used as a light multiplexing optical waveguide, an output light waveguide is used as an optical waveguide for entering, while an incident light waveguide is used as an optical waveguide for outgoing. The optical waveguide of the present invention is a light multiplexing optical waveguide comprising: a multi-mode optical waveguide; at least one optical waveguide (A) to be used for outgoing, the optical waveguide (A) being optically connected to one end of the multi-mode optical waveguide; and a larger number of optical waveguides (B) to be used for entering than that of the optical waveguide (A), the optical waveguides (B) being optically connected to the other end of the multi-mode optical waveguide, in which: the intensity distribution with at least one optical waveguide (a) out of the optical waveguide (A) at a connecting surface of the optical waveguide (A) and the multi-mode optical waveguide is asymmetric with respect to the geometrical central axis of the optical waveguide (a); and the extended line of the geometrical central axis of the optical waveguide (a) does not coincide with the geometrical central axis of the multi-mode optical waveguide or the core shape of the multi-mode optical waveguide is asymmetric with respect to the geometrical central axis of the multi-mode optical waveguide.

Next, examples of materials for a core and a clad constituting the multi-mode optical waveguide of the present invention include variously such inorganic materials as a glass and a semiconductor material; and such organic materials as a resin. Of those, a polymer such as a resin is preferable because it can be easily processed in a short time period by means of dry etching or the like. It should be noted that a cavity can be used as the clad partially or entirely. Any polymer can be used as such polymer, and specific examples thereof include a polyimide-based resin such as a polyimide resin, a poly (imide-isoindoloquinazolinedioneimide) resin, a polyether-imide resin, a polyether-ketone resin, or a polyester imide resin; a silicone-based resin; an acrylic resin; a polystyrene-based resin; a polycarbonate-based resin; a polyamide-based resin; a polyester-based resin; a phenol-based polyamide-based resin; a polyester-based resin; a phenol-based resin; a polyquinoline-based resin; a polyquinoxaline-based resin; a polybenzoxazole-based resin; a polybenzothiazole-based resin; a polybenzoimidazole-based resin; and such a resin as a silicone resin containing polysilane described in JP-A-2001-296438 and a nitron compound, polymethylmethacrylate containing DMAPN {(4-N,N-dimethylaminophenyl)-N-phenylnitron}, a dye polymer, a polyimide resin or epoxy resin containing a nitron compound, or a hydrolysable silane compound described in JP-A-2000-66051, all for photobleaching. Each of the above resins may have a fluorine atom. Examples of a preferable polymer include polyimide resins because of their high glass transition temperatures (Tg) and excellent heat resistance. Of those, a polyimide-based resin containing fluorine is particularly preferable because of its transmittance and refractive index property.

Examples of the polyimide-based resin containing fluorine include a polyimide resin containing fluorine, a poly(imide-.isoindoloquinazolinedioneimide) resin containing fluorine, a polyether-imide resin containing fluorine, and a polyamide-imide resin containing fluorine.

A precursor solution for the polyimide-based resin containing fluorine can be prepared by causing a tetracarboxylic dianhydride and a diamine to react with each other in a polar solvent such as: N-methyl-2-pyrrolidone; N,N-dimethylacetamide; γ-butyrolactone; or dimethyl sulfoxide. Each of the tetracarboxylic dianhydride and the diamine may contain fluorine, or only one of them may contain fluorine.

In addition, a precursor solution for the polyimide-based resin free of fluorine can be prepared by causing a tetracarboxylic dianhydride free of fluorine and a diamine free of fluorine to react with each other in a polar solvent such as: N-methyl-2-pyrrolidone; N,N-dimethylacetamide; γ-butyrolactone; or dimethyl sulfoxide.

Examples of an acid dianhydride containing fluorine include: (trifluoromethyl)pyromellitic dianhydride; di(trifluoromethyl)pyromellitic dianhydride; di(heptafluoropropyl)pyromellitic dianhydride; pentafluoroethyl pyromellitic dianhydride; bis{3,5-di(trifluoromethyl) phenoxy}pyromellitic dianhydride; 2,2-bis(3,4-dicarboxyphenyl)hexafluoropropane dianhydride; 5,5'-bis(trifluoromethyl)-3,3',4,4'-tetracarboxybiphenyl dianhydride; 2,2',5, 5'-tetrakis(trifluoromethyl)-3,3',4,4'-tetracarboxybiphenyl dianhydride; 5,5'-bis(trifluoromethyl) 3,3',4,4'-tetracarboxydiphenyl ether dianhydride; 5,5'-bis(trifluoromethyl)-3,3',4, 4'-tetracarboxybenzophenone dianhydride; bis{(trifluoromethyl)dicarboxyphenoxy}benzene dianhydride; bis{(trifluoromethyl)dicarboxyphenoxy}(trifluoromethyl) benzene dianhydride; bis(dicarboxyphenoxy)(trifluoromethyl)benzene dianhydride; bis(dicarboxyphenoxy)bis(trifluoromethyl)benzene dianhydride; bis(dicarboxyphenoxy)tetrakis(trifluoromethyl)benzene dianhydride; 2,2-bis{(4-(3,4-dicarboxyphenoxy)phenyl}hexafluoropropane dianhydride; bis{(trifluoromethyl)dicarboxyphenoxy}biphenyl dianhydride; bis{

(trifluoromethyl)dicarboxyphenoxy}bis(trifluoromethyl) biphenyl dianhydride; bis{(trifluoromethyl)dicarboxyphenoxy}diphenyl ether dianhydride; and bis(dicarboxyphenoxy)bis(trifluoromethyl)biphenyl dianhydride.

Examples of the diamine containing fluorine include: 4-(1H,1H,11H-eicosafluoroundecanoxy)-1,3-diaminobenzene; 4-(1H,1H-perfluoro-1-butanoxy)-1,3-diaminobenzene; 4-(1H,1H-perfluoro-1-heptanoxy)-1,3-diaminobenzene; 4-(1H,1H-perfluoro-1-octanoxy)-1,3-diaminobenzene; 4-pentafluorophenoxy-1,3-diaminobenzene; 4-(2,3,5,6-tetrafluorophenoxy)-1,3-diaminobenzene; 4-(4-fluorophenoxy)-1,3-diaminobenzene; 4-(1H,1H,2H,2H-perfluoro-1-hexanoxy)-1,3-diaminobenzene; 4-(1H,1H,2H,2H-perfluoro-1-dodecanoxy)-1,3-diaminobenzene; 2,5-diaminobenzotrifluoride; bis(trifluoromethyl)phenylenediamine; diaminotetra(trifluoromethyl)benzene; diamino(pentafluoroethyl)benzene; 2,5-diamino(perfluorohexyl)benzene; 2,5-diamino(perfluorobutyl)benzene; 2,2'-bis(trifluoromethyl)-4,4'-diaminobiphenyl; 3,3'-bis(trifluoromethyl)-4,4'-diaminobiphenyl; ocafluorobenzidine; 4,4'-diaminodiphenyl ether; 2,2-bis(p-aminophenyl)hexafluoropropane; 1,3-bis(anilino)hexafluoropropane; 1,4-bis(anilino)octafluorobutane; 1,5-bis(anilino)decafluoropentane; 1,7-bis(anilino)tetradecafluoroheptane; 2,2'-bis(trifluoromethyl)-4,4'-diaminodiphenyl ether; 3,3'-bis(trifluoromethyl)-4,4'-diaminodiphenyl ether; 3,3',5,5'-tetrakis(trifluoromethyl)-4,4'-diaminodiphenyl ether; 3,3'-bis(trifluoromethyl)-4,4'-diaminobenzophenone; 4,4'-diamino-p-terphenyl; 1,4-bis(p-aminophenyl)benzene; p-bis(4-amino-2-trifluoromethylphenoxy)benzene; bis(aminophenoxy)bis(trifluoromethyl)benzene; bis(aminophenoxy)tetrakis(trifluoromethyl)benzene; 2,2-bis{4-(4-aminophenoxy)phenyl}hexafluoropropane; 2,2-bis{4-(3-aminophenoxy)phenyl}hexafluoropropane; 2,2-bis{4-(2-aminophenoxy)phenyl}hexafluoropropane; 2,2-bis{4-(4-aminophenoxy)-3,5-dimethylphenyl}hexafluoropropane; 2,2-bis{4-(4-aminophenoxy)-3,5-ditrifluoromethylphenyl}hexafluoropropane; 4,4'-bis(4-amino-2-trifluoromethylphenoxy)biphenyl; 4,4'-bis(4-amino-3-trifluoromethylphenoxy)biphenyl; 4,4'-bis(4-amino-2-trifluoromethylphenoxy)diphenylsulfone; 4,4'-bis(3-amino-5-trifluoromethylphenoxy)diphenylsulfone; 2,2-bis{4-(4-amino-3-trifluoromethylphenoxy)phenyl}hexafluoropropane; bis{(trifluoromethyl)aminophenoxy}biphenyl; bis[{(trifluoromethyl)aminophenoxy}phenyl]hexafluoropropane; and bis{2-[(aminophenoxy)phenyl]hexafluoroisopropyl}benzene.

Two or more kinds of the above tetracarboxylic dianhydrides and diamines may be used in combination. A solution having photosensitivity can be used as a precursor solution for a polyimide-based resin.

The precursor solution for a polyimide-based resin is applied over the surface of a substrate by means of, for example, a spinner or printing, and is subjected to a heat treatment at a final temperature of 200 to 400° C. for curing. Thus, a polyimide-based resin film is obtained.

An optical device of the present invention is constituted by means of the optical waveguide according to any one of the above items (1) to (10). Examples of such optical device include an optical splitter, a directional optical coupler, an optical coupler, an optical coupling and branching device, an optical multiplexing and branching filter, an optical transmitter module, an optical receiver module, an optical transmitter/receiver module, an optical switch, an optical modulator, an optical filter, an optical polarizer, an optical dispersion compensator, an optical add-drop module, and an optical crossconnect.

EXAMPLES

Next, the present invention will be described in more detail by way of examples. However, the present invention is not limited to these examples at all.

Example 1

Figure 10:
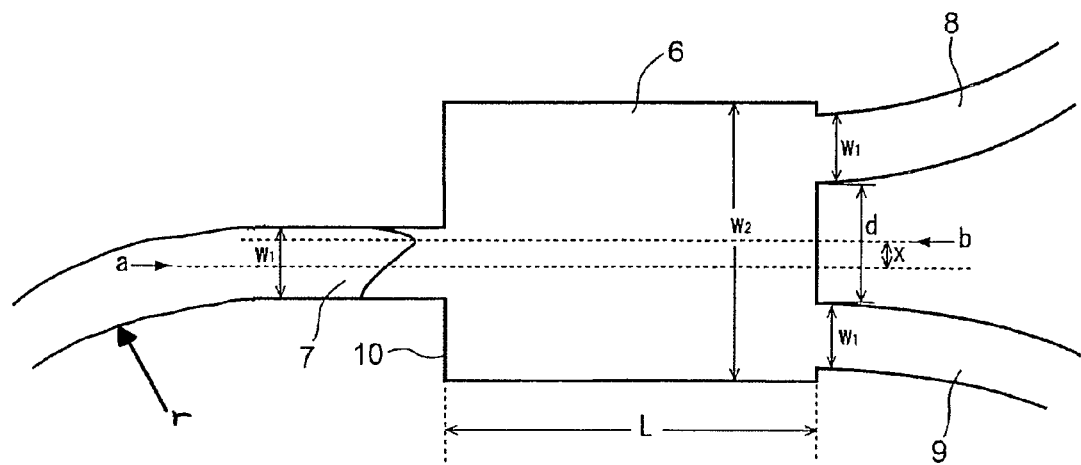
FIG. 10 is a schematic view showing the light branching optical waveguide of the present invention.

A light branching optical waveguide having a sketchy structure shown in FIG. 10 was produced by means of the following materials.
Core: Fluorinated polyimide resin ("OPI-N3205" manufactured by Hitachi Chemical Co., Ltd.)
Clad: Fluorinated polyimide resin ("OPI-N1005" manufactured by Hitachi Chemical Co., Ltd.)

The incident light waveguide (single mode, core portion) 7, and the two output light waveguides (single mode, core portions) 8 and 9 each had a width $w_1$ of 6.5 μm, the multi-mode optical waveguide had a width $w_2$ of 15 μm and a length L of 220 μm, and a distance d between the output light waveguides (single mode, core portions) at the exit of the multi-mode optical waveguide was 3.5 μm. The incident light waveguide (core portion) 7 had a curve portion with a radius r of curvature as 15 mm, as shown in FIG. 10. The intensity distribution of light entering into the multi-mode optical waveguide from the incident light waveguide at the connecting surface 10 of the incident light waveguide and the multi-mode optical waveguide was of a shape asymmetric with respect to the geometrical central axis of the incident light waveguide. The offset x between the geometrical central axis a of the incident light waveguide (core portion) 7 and the geometrical central axis b of the multi-mode optical waveguide was 0.5 μm. A branching ratio between the quantities of light having a wavelength of 1.55 μm outgoing to the two output light waveguides (core portions) 8 and 9 was measured. As a result, the branching ratio of light was 0.99:1.

Comparative Example 1

A light branching optical waveguide was produced in the same manner as in Example 1 except that no offset between the geometrical central axis a of the incident light waveguide (core portion) 7 and the geometrical central axis b of the multi-mode optical waveguide was performed, and a branching ratio between the quantities of light outgoing to the two output light waveguides (core portions) 8 and 9 was measured. As a result, the branching ratio of light having a wavelength of 1.31 μm was 0.98:1, while the branching ratio of light having a wavelength of 1.55 μm was 0.90:1.

Example 2

Figure 11:
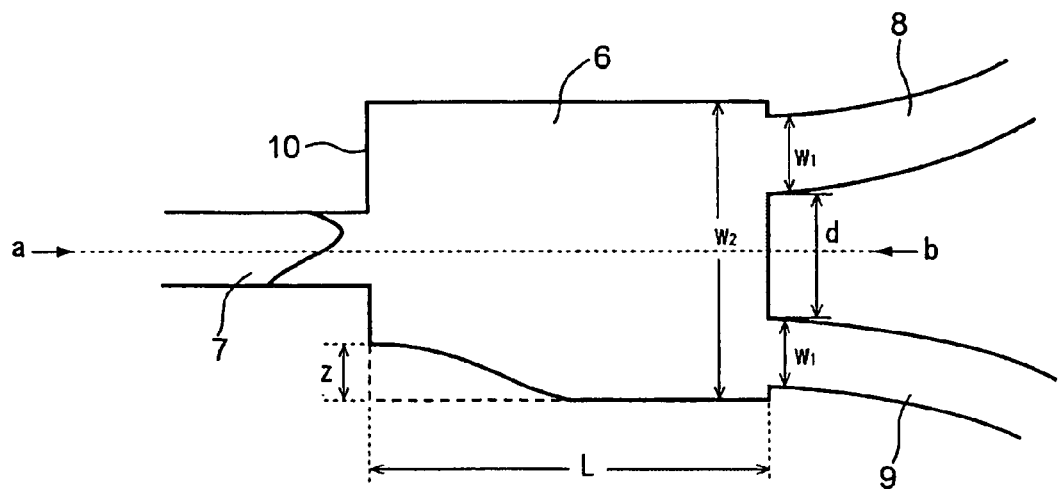
FIG. 11 is a schematic view showing the other light branching optical waveguide of the present invention.

A light branching optical waveguide having a multi-mode optical waveguide with a core shape having such a notch as shown in FIG. 11 was produced by means of the same materials as those shown in Example 1.

The incident light waveguide (core portion) 7, and the two output light waveguides (core portions) 8 and 9 each had a width $w_1$ of 6.5 μm, the multi-mode optical waveguide had a width $w_2$ of 15 μm and a length L of 220 μm, and a distance d between the output light waveguides at the exit of the multi-mode optical waveguide was 3.5 μm. The geometrical central axis a of the incident light waveguide (core portion) 7 and the geometrical central axis b of the multi-mode optical waveguide were allowed to coincide with each other. The entrance portion of the multi-mode optical waveguide was cut from a side edge by a distance z (z=0.6 μm). That is, the multi-mode optical waveguide had a sinusoidal curve structure ranging from its entrance portion to its exit portion. Although not shown, the incident light waveguide (core portion) 7 had a curve portion with a radius r of curvature as 15 mm. The intensity distribution of light entering into the multi-mode optical waveguide from the incident light waveguide at the connecting surface 10 of the incident light waveguide and the multi-mode optical waveguide was of a shape asymmetric with respect to the geometrical central axis a of the incident light waveguide. A branching ratio between the quantities of light having a wavelength of 1.31 μm outgoing to the two output light waveguides (core portions) 8 and 9 was measured. As a result, the branching ratio of light was 1:1.

Example 3

Figure 12:
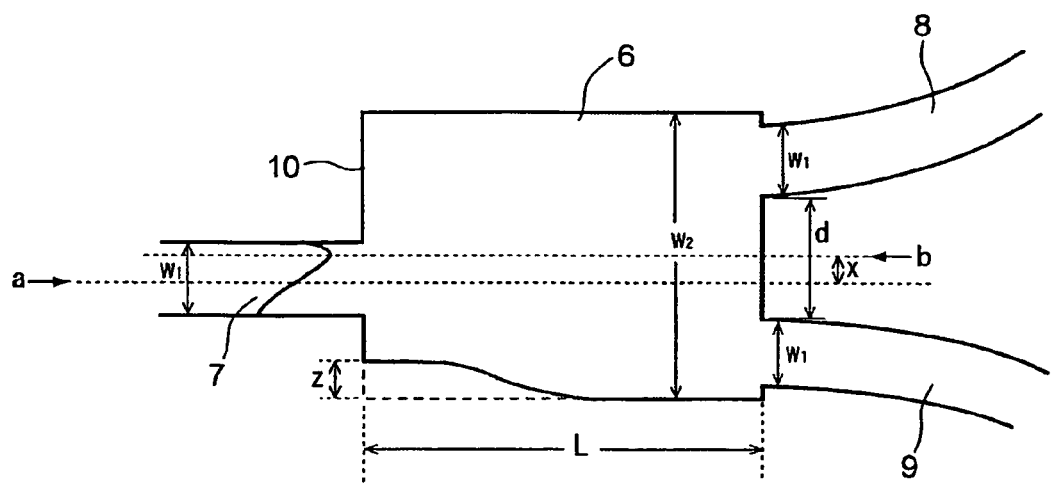
FIG. 12 is a schematic view showing the other light branching optical waveguide of the present invention.

A light branching optical waveguide having the core shape of a multi-mode optical waveguide having such a notch as shown in FIG. 12 and an offset structure was produced by means of the same materials as those shown in Example 1.

The incident light waveguide (core portion) 7, and the two output light waveguides (core portions) 8 and 9 each had a width $w_1$ of 6.5 μm, the multi-mode optical waveguide had a width $w_2$ of 15 μm and a length L of 220 μm, and a distance d between the output light waveguides at the exit of the multi-mode optical waveguide was 3.5 μm. The entrance portion of the multi-mode optical waveguide was cut from a side edge by a distance z (z=0.8 μm). That is, the multi-mode optical waveguide had a sinusoidal curve structure ranging from its entrance portion to its exit portion. The offset x between the geometrical central axis a of the incident light waveguide (core portion) 7 and the geometrical central axis b of the multi-mode optical waveguide was 0.9 μm.

Note that, although not shown, the incident light waveguide (core portion) 7 had a curve portion with a radius r of curvature as 15 mm. The intensity distribution of light entering into the multi-mode optical waveguide from the incident light waveguide at the connecting surface 10 of the incident light waveguide and the multi-mode optical waveguide was of a shape asymmetric with respect to the geometrical central axis a of the incident light waveguide.

A branching ratio between the quantities of light having a wavelength of 1.55 μm outgoing to the two output light waveguides (core portions) 8 and 9 was measured. As a result, the branching ratio of light was 1:1.

Example 4

A light branching optical waveguide was produced in the same manner as in Example 3 except that: the entrance portion of the multi-mode optical waveguide was cut from a side edge by a distance z (z=0.2 μm); and the offset x between the geometrical central axis a of the incident light waveguide (core portion) 7 and the geometrical central axis b of the multi-mode optical waveguide was 0.5 μm.

A branching ratio between the quantities of light having a wavelength of 1.31 μm or 1.55 μm outgoing to the two output light waveguides (core portions) 8 and 9 was measured. As a result, the branching ratio of light having a wavelength of 1.31 μm was 0.99:1, while the branching ratio of light having a wavelength of 1.55 μm was 1.01:1.

Comparison between Example 1 and Example 3 showed that the examples had the same optical waveguide shape except for the distance z from a side edge and the offset x, and that a branching ratio was substantially equal in each example. That is, a branching ratio of 1:1 was attained by combining multiple z's and x's. In each of Examples 1 and 3, a branching ratio of substantially equal was attained by selecting z and x satisfying the relationship of z=−2.08x+1.12.

Although the relationship between z and x varies depending on the curvature of the incident light waveguide, z and x can be similarly selected in such a manner that a branching ratio is substantially equal.

Furthermore, z and x can be selected in such a manner that a branching ratio is substantially equal even when two kinds of light different from each other in wavelength are used although the relationship between z and x varies depending on the wavelength of light to be used. Therefore, as shown in Example 4, a branching ratio of 1:1 was attained by means of two kinds of light different from each other in wavelength.

That is, according to the light branching optical waveguide having the structure shown in FIG. 12, even when the intensity distribution of light entering into the multi-mode optical waveguide (core portion) 6 from the incident light waveguide (core portion) 7 at the connecting surface 10 of the incident light waveguide and the multi-mode optical waveguide is asymmetric with respect to the geometrical central axis of the incident light waveguide (core portion) 7, a branching ratio between the quantities of light outgoing to the two output light waveguides (core portions) 8 and 9 can be substantially equal independent of the wavelength of light.

INDUSTRIAL APPLICABILITY

According to the present invention, there can be provided a low-loss light branching optical waveguide having a reduced branch loss and a reduced variation in branching ratio. In addition, there can be provided a light branching optical waveguide having small wavelength dependence as well as a reduced branch loss and a reduced variation in branching ratio. In addition, the use of the light branching optical waveguide as a splitter module provides an optical device having a small light loss and a stable branching ratio of 1:1.

The invention claimed is:

1. A light branching optical waveguide, comprising:
   at least one incident light waveguide (A), including an optical waveguide (a), optically connected to one end of a multi-mode optical waveguide, the multi-mode optical waveguide having a geometrical central axis, and wherein light of a basic mode propagating in said optical waveguide (a) enters on the geometrical central axis of the multi-mode optical waveguide; and
   output light waveguides (B) larger in number than the at least one incident light waveguide (A), optically connected to the other end of the multi-mode waveguide,
   the light branching optical waveguide being characterized in that:
   an intensity distribution of light entering from said optical waveguide (a), of the at least one incident light waveguide (A), into the multi-mode optical waveguide at a connecting surface of the at least one incident light waveguide (A) and the multi-mode optical waveguide, is asymmetric with respect to a geometrical central axis of said optical waveguide (a), said optical waveguide (a), of the at least one incident light waveguide (A), having a curved structure, with light entering from said optical waveguide (a) into said multi-mode optical waveguide, and with light having a wavelength entering at least two of said output light waveguides (B) from said multi-mode optical waveguide, so as to branch said light from the multi-mode optical waveguide having the same wavelength into each of said at least two of said output light waveguides (B), a branching ratio between quantities of light branched into each of said at least two of said output light waveguides (B) being substantially equal; and an extended line of the geometrical central axis of said optical waveguide (a) does not coincide with a geometrical central axis of the multi-mode optical waveguide.

2. A light branching optical waveguide according to claim 1, characterized in that an optical central axis having a peak intensity in the intensity distribution of light entering into the multi-mode optical waveguide from optical waveguide (a) substantially coincides with the geometrical central axis of the multi-mode optical waveguide.

3. A light branching optical waveguide according to claim 1, wherein:
the at least one incident light waveguide (A) comprises one incident light waveguide; and
the output light waveguides (B) comprise two or more output light waveguides.

4. A light branching optical waveguide according to claim 1, wherein at least one of the at least one incident light waveguide (A) and the output light waveguides (B) comprises a single-mode optical waveguide.

5. A light branching optical waveguide according to claim 1, wherein at least one of the core and a clad constituting the multi-mode optical waveguide is composed of a polymer partially or entirely.

6. A light branching optical waveguide according to claim 5, wherein the polymer comprises a polyimide-based resin containing fluorine.

7. An optical device comprising the light branching optical waveguide according to claim 1.

8. A light branching optical waveguide according to claim 1, wherein an offset distance between the extended line of the geometrical central axis of said optical waveguide (a) and the geometrical central axis of the multi-mode optical waveguide is 1.5 µm or less.

9. A light branching optical waveguide according to claim 1, wherein said offset distance is 0.7 µm or less.

10. A light branching optical waveguide according to claim 1, wherein said optical waveguide (a) is directly optically connected to said multi-mode optical waveguide.

11. A light branching optical waveguide according to claim 1, wherein said light entering said multi-mode optical waveguide from said at least one optical waveguide (a) has said wavelength.

12. A light branching optical waveguide according to claim 1, wherein said wavelength is a single wavelength.

13. A light branching optical waveguide, comprising:
at least one incident light waveguide (A), including an optical waveguide (a), optically connected to one end of a multi-mode optical waveguide, the multi-mode optical waveguide having a geometrical central axis, and wherein light of a basic mode propagating in said optical waveguide (a) enters on the geometrical central axis of the multi-mode optical waveguide; and
output light waveguides (B) larger in number than the at least one incident light waveguide (A), optically connected to the other end of the multi-mode optical waveguide,
the light branching optical waveguide being characterized in that:
an intensity distribution of light entering from said optical waveguide (a), of the at least one incident light waveguide (A), into the multi-mode optical waveguide at a connecting surface of the at least one incident light waveguide (A) and the multi-mode optical waveguide, is asymmetric with respect to a geometrical central axis of said optical waveguide (a), said optical waveguide (a), of the at least one incident light waveguide (A), having a curved structure, with light entering from said optical waveguide (a) into said multi-mode optical waveguide, and with light having a wavelength entering at least two of said output light waveguides (B) from said multi-mode optical waveguide, so as to branch said light from the multi-mode optical waveguide having the same wavelength into each of said at least two of said output light waveguides (B), a branching ratio between quantities of light branched into each of said at least two of said output light waveguides (B) being substantially equal; and a core shape of the multi-mode optical waveguide is asymmetric with respect to a geometrical central axis of the multi-mode optical waveguide.

14. A light branching optical waveguide according to claim 13, wherein an extended line of the geometrical central axis of said optical waveguide (a) does not coincide with the geometrical central axis of the multi-mode optical waveguide.

15. A light branching optical waveguide according to claim 13, wherein the core shape of the multi-mode optical waveguide has a notch at least one of its side edges.

16. A light branching optical waveguide according to claim 15, wherein:
the notch is obtained by cutting out a core of the multi-mode optical waveguide from a side to be connected to the at least one incident light waveguide (A) to a side edge of the core; and
a shape of the notch has a sinusoidal curve ranging from the side to be connected to the at least one incident light waveguide (A) to a side to be connected to the output light waveguides (B).

17. A light branching optical waveguide according to claim 13, characterized in that an optical central axis having a peak intensity in the intensity distribution of light entering into the multi-mode optical waveguide from said optical waveguide (a) substantially coincides with the geometrical central axis of the multi-mode optical waveguide.

18. A light branching optical waveguide according to claim 17, wherein the core shape of the multi-mode optical waveguide has a notch at least one of its side edges.

19. A light branching optical waveguide according to claim 18, wherein:
the notch is obtained by cutting out a core of the multi-mode optical waveguide from a side to be connected to the at least one incident light waveguide (A) to a side edge of the core; and
a shape of the notch has a sinusoidal curve ranging from the side to be connected to the at least one incident light waveguide (A) to a side to be connected to the output light waveguides (B).

20. A light branching optical waveguide according to claim 13, wherein:
the at least one incident light waveguide (A) comprises one incident light waveguide; and
the output light waveguides (B) comprise two or more output light waveguides.

21. A light branching optical waveguide according to claim 13, wherein at least one of the at least one incident light waveguide (A) and the output light waveguides (B) comprises a single-mode optical waveguide.

22. A light branching optical waveguide according to claim 13, wherein at least one of the core and a clad constituting the multi-mode optical waveguide is composed of a polymer partially or entirely.

23. An optical device comprising the light branching optical waveguide according to claim 13.

24. A light branching optical waveguide according to claim 13, wherein said optical waveguide (a) is directly optically connected to said multi-mode optical waveguide.

25. A light branching optical waveguide according to claim 13, wherein said light entering said multi-mode optical waveguide from said at least one optical waveguide (a) has said wavelength.

26. A light branching optical waveguide according to claim 13, wherein said wavelength is a single wavelength.

27. A method of manufacturing a light branching optical waveguide, having at least one incident light waveguide (A), including an optical waveguide (a), optically connected to one end of a multi-mode optical waveguide, the multi-mode optical waveguide having a geometrical central axis, and wherein light of a basic mode propagating in said optical waveguide (a) enters on the geometrical central axis of the multi-mode optical waveguide, and output light waveguides (B) larger in number than the number of incident light waveguides (A), optically connected to the other end of the multi-mode optical waveguide, an intensity distribution of light entering the multi-mode optical waveguide, from said optical waveguide (a), is asymmetric with respect to a geometrical central axis of said optical waveguide (a), wherein said optical waveguide (a), of the at least one incident light waveguide (A), is a curved optical waveguide, with light entering from said optical waveguide (a) into said multi-mode optical waveguide, and with light having a wavelength entering at least two of said output light waveguides (B) from said multi-mode optical waveguide, so as to branch said light from the multi-mode optical waveguide having the same wavelength into each of said at least two of said output light waveguides (B), a branching ratio between quantities of light branched into each of said at least two of said output light waveguides (B) being substantially equal, comprising the step of:

positioning said optical waveguide (a) such that an extended line of the geometrical central axis of said optical waveguide (a) does not coincide with a geometrical central axis of the multi-mode optical waveguide.

28. The method according to claim 27, wherein the at least one incident light waveguide (A) is one incident light waveguide (A), said optical waveguide (a) is one optical waveguide (a), and the output light waveguides (B) are at least two in number.

29. The method according to claim 27, wherein said at least one optical waveguide (a) is directly optically connected to said multi-mode optical waveguide.

30. The method according to claim 27, wherein said light entering said multi-mode optical waveguide from said optical waveguide (a) has said wavelength.

31. The method according to claim 27, wherein said wavelength is a single wavelength.

32. A method of manufacturing a light branching optical waveguide, having at least one incident light waveguide (A), including an optical waveguide (a), optically connected to one end of a multi-mode optical waveguide, the multi-mode optical waveguide having a geometrical central axis, and wherein light of a basic mode propagating in said optical waveguide (a) enters on the geometrical central axis of the multi-mode optical waveguide, and output light waveguides (B) larger in number than the number of incident light waveguides (A), optically connected to the other end of the multi-mode optical waveguide, an intensity distribution of light entering the multi-mode optical waveguide, from said optical waveguide (a), is asymmetric with respect to a geometrical central axis of said optical waveguide (a), wherein said optical waveguide (a), of the at least one incident light waveguide (A), is a curved optical waveguide, with light entering from said optical waveguide (a) into said multi-mode optical waveguide, and with light having a wavelength entering at least two of said output light waveguides (B) from said multi-mode optical waveguide, so as to branch said light from the multi-mode optical waveguide having the same wavelength into each of said at least two of said output light waveguides (B), a branching ratio between quantities of light branched into each of said at least two of said output light waveguides (B) being substantially equal, comprising the step of:

forming a core shape of the multi-mode optical waveguide to be asymmetric with respect to a geometrical central axis of the multi-mode optical waveguide.

33. The method according to claim 32, wherein the at least one incident light waveguide (A) is one incident light waveguide (A), said optical waveguide (a) is one optical waveguide (a), and the output light waveguides (B) are at least two in number.

34. The method according to claim 32, wherein said optical waveguide (a) is directly optically connected to said multi-mode optical waveguide.

35. The method according to claim 32, wherein said light entering said multi-mode optical waveguide from said optical waveguide (a) has said wavelength.

36. The method according to claim 32, wherein said wavelength is a single wavelength.

* * * * *